United States Patent [19]

Rinderer

[11] Patent Number: 5,587,555
[45] Date of Patent: Dec. 24, 1996

[54] CONDUCTOR HOLDING DEVICE

[75] Inventor: Eric R. Rinderer, Highland, Ill.

[73] Assignee: B-Line Systems, Inc., Highland, Ill.

[21] Appl. No.: 253,507

[22] Filed: Jun. 3, 1994

[51] Int. Cl.⁶ .................................................. H02G 3/10
[52] U.S. Cl. .......................... 174/49; 174/48; 174/154; 174/155; 411/502
[58] Field of Search .......................... 174/48, 49, 154, 174/155, 156, 157; 411/456, 502

[56] References Cited

U.S. PATENT DOCUMENTS

| | | | |
|---|---|---|---|
| 799,092 | 9/1905 | Rosenfeld . | |
| 2,004,353 | 6/1935 | Sinnaeve | 280/106 |
| 2,179,406 | 11/1939 | Fitzpatrick | 248/68 |
| 2,340,249 | 1/1944 | Murphy | 24/73 |
| 2,376,314 | 5/1945 | Cogswell | 24/73 |
| 2,394,518 | 2/1946 | Kindorf | 248/68 |
| 2,896,887 | 7/1959 | Beltz | 248/68 |
| 2,918,240 | 12/1959 | Wiegand | 248/71 |
| 2,948,937 | 8/1960 | Rapata | 24/73 |
| 2,972,460 | 2/1961 | Kenyon | 248/62 |
| 2,972,461 | 2/1961 | Balbach et al. | 248/68 |
| 2,992,800 | 7/1961 | Madson | 248/74 |
| 3,090,826 | 5/1963 | Cochran | 174/158 |
| 3,098,273 | 7/1963 | Cochran | 24/73 |
| 3,194,524 | 7/1965 | Trumbull | 248/74 |
| 3,339,870 | 9/1967 | Damsgaard | 248/68 |
| 3,363,864 | 1/1968 | Olgreen | 248/68 |
| 3,376,005 | 4/1968 | Swanquist | 248/223 |
| 3,404,858 | 10/1968 | Levy | 248/68 |
| 3,417,438 | 12/1968 | Schuplin | 24/73 |
| 3,431,349 | 3/1969 | Hamilton | 174/38 |
| 3,861,015 | 1/1975 | Hooven | 29/203 |
| 4,032,096 | 6/1977 | Perrault et al. | 248/73 |
| 4,126,012 | 11/1978 | Waller | 405/157 |
| 4,141,524 | 2/1979 | Corvese, Jr. | 248/70 |
| 4,399,922 | 8/1983 | Horsley | 220/3.6 |
| 4,560,126 | 12/1985 | Judkins et al. | 248/72 |
| 4,566,660 | 1/1986 | Anscher et al. | 248/74.2 |
| 4,623,102 | 11/1986 | Hough, Jr. | 248/68.1 |
| 4,679,754 | 7/1987 | Richards | 248/68.1 |
| 4,709,888 | 12/1987 | Cubit et al. | 248/73 |
| 4,795,856 | 1/1989 | Farmer | 174/40 R |
| 4,905,942 | 3/1990 | Moretti | 248/68.1 |
| 4,936,530 | 6/1990 | Wollar | 248/71 |
| 4,960,253 | 10/1990 | Perrault et al. | 248/68.1 |
| 5,067,677 | 11/1991 | Miceli | 248/68.1 |
| 5,085,384 | 2/1992 | Kasubke | 248/62 |
| 5,141,185 | 8/1992 | Rumbold et al. | 248/71 |
| 5,149,026 | 9/1992 | Allen | 248/68.1 |
| 5,149,027 | 9/1992 | Weber | 248/68.1 |
| 5,150,865 | 9/1992 | Miller | 248/71 |
| 5,188,318 | 2/1993 | Newcomer et al. | 248/68.1 |

FOREIGN PATENT DOCUMENTS

| 2040739 | 4/1991 | Canada . |
|---|---|---|
| 33324 | 11/1964 | Germany . |

OTHER PUBLICATIONS

National Electric Code—Article 300-(d) Wiring Methods (1990).
Technical Committee Report 3–18, 3–19 (300–4(d)) (1990).

*Primary Examiner*—Kristine L. Kincaid
*Assistant Examiner*—Dean A. Reichard
*Attorney, Agent, or Firm*—Senniger, Powers, Leavitt & Roedel

[57] ABSTRACT

A device to be mounted on a support member for holding a conductor in a substantially fixed position extending generally parallel to the support member. The device includes a bracket having an arm with at least one opening therein and a clamp having a head and at least one leg projecting from the head adapted for reception in the opening in the arm. The leg of the clamp is movable in the opening in a first axial direction with respect to the leg so that the head of the clamp can be pushed closer to the arm to move the clamp to a clamping position in which the head of the clamp is in clamping engagement with a conductor disposed between the head and the arm. The device further includes a retainer for retaining the clamp in its clamping position. The retainer includes structure on the arm for biting into the leg of the clamp when the clamp is pushed to its clamping position thereby to lock the clamp in its clamping position by inhibiting any movement of the head of the clamp away from the arm after the clamp has been moved to its clamping position.

21 Claims, 4 Drawing Sheets

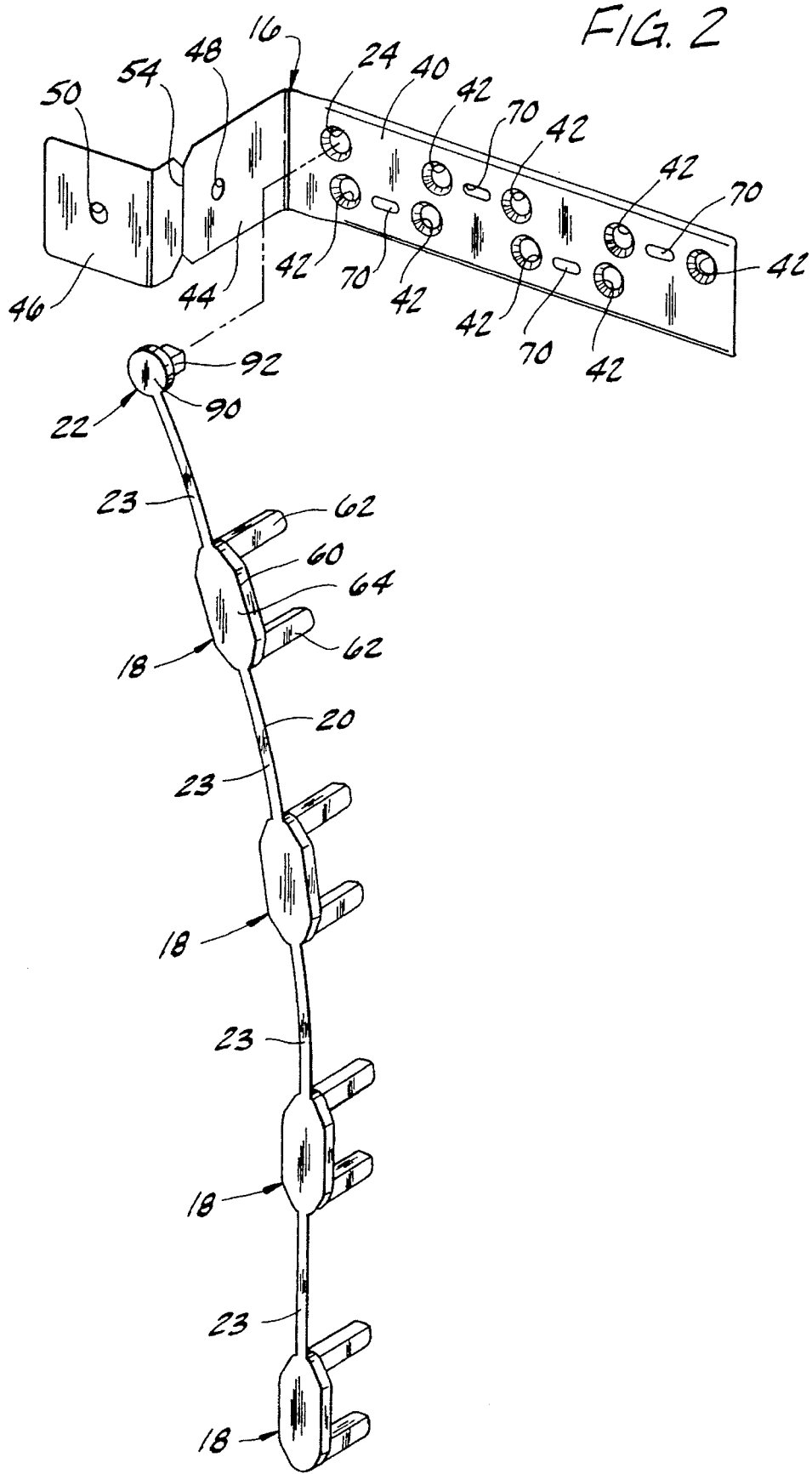

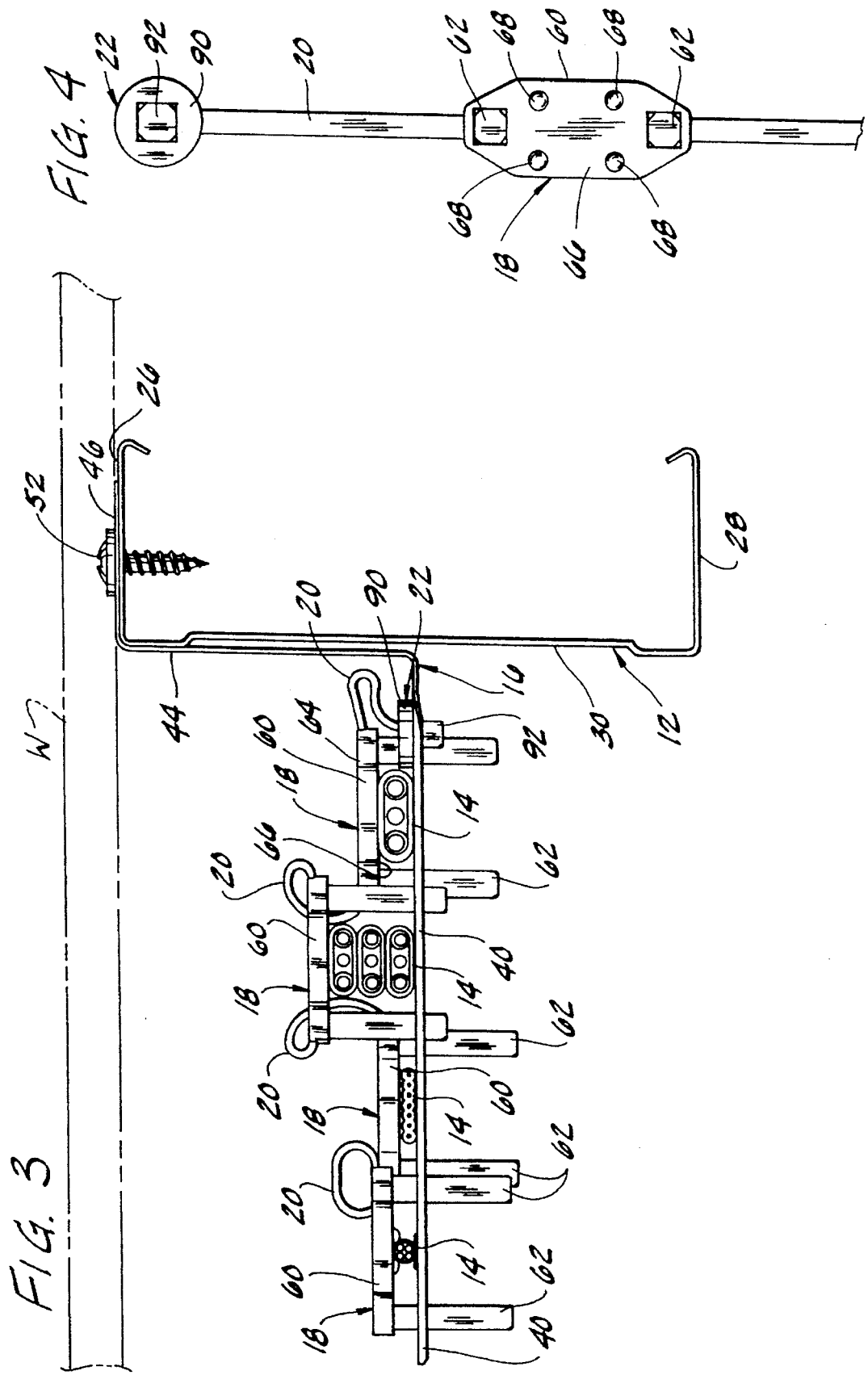

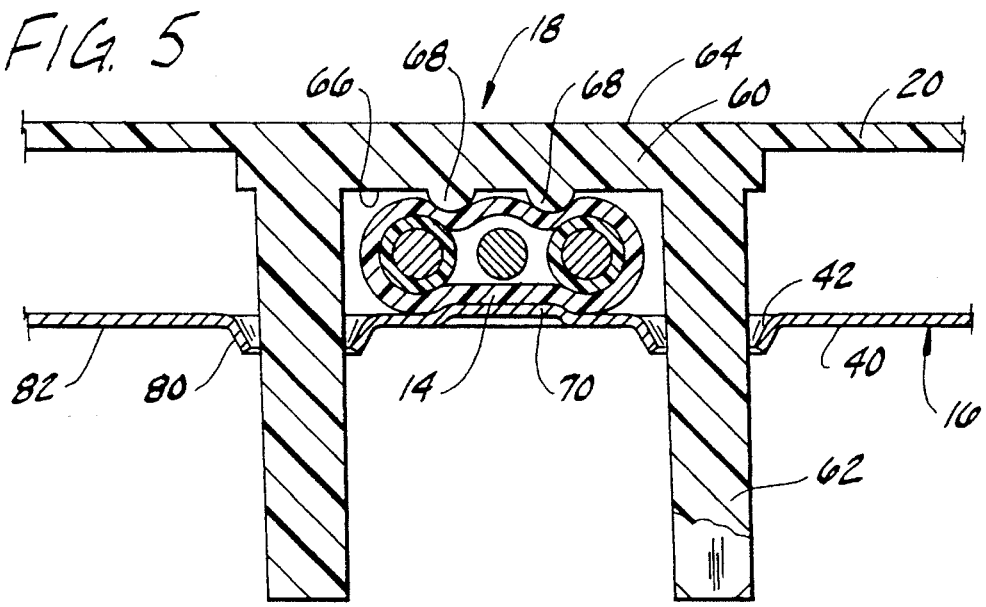
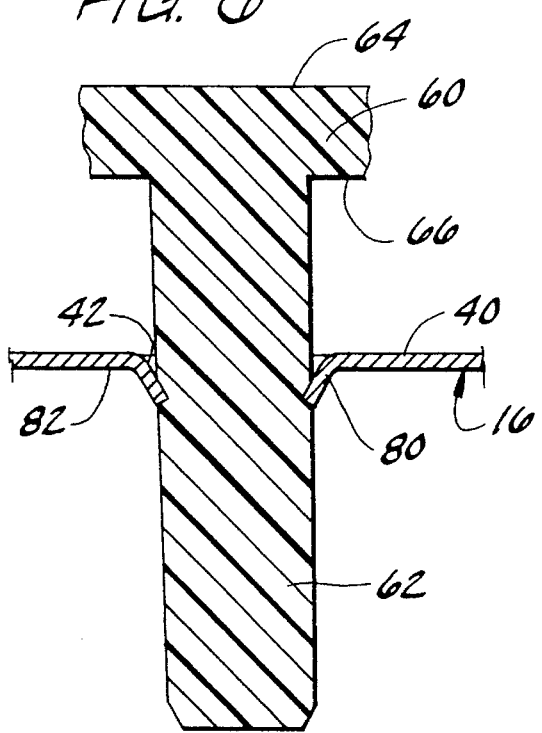
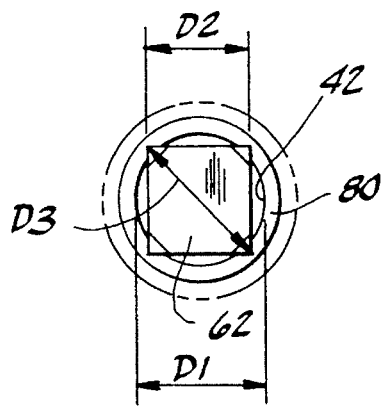
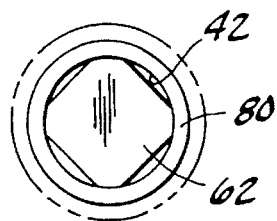

CONDUCTOR HOLDING DEVICE

BACKGROUND OF THE INVENTION

This invention relates generally to the building construction industry, and more particularly to a device adapted for securely maintaining electrical conductors (e.g., ROMEX wiring) at a predetermined distance from a wall.

In constructing or rehabbing buildings, homes, and the like, studs are secured vertically to define a frame for walls of the building. Electrical conductors, such as wiring, are secured to the studs to provide electricity and other utilities throughout the building. Plasterboard (drywall) is thereafter secured to the studs with screws, nails or other fasteners to form the walls of the building. Typically, nail or screw guns are used to rapidly and forcefully drive fasteners into the studs. Because the studs are behind the drywall, and because the fasteners are installed rapidly with a gun, it is not uncommon for a fastener to miss the stud during the installation process. This can damage an electrical conductor behind the wall. Electrical wiring for homes is typically 120 or 240 volts, and for commercial buildings, the voltages can be significantly higher. Thus, an installer is exposed to the risk of a severe electrical shock. A damaged wire may also create a dangerous fire hazard.

Further, to decorate a completed building, pictures, clocks, lighting fixtures and other items are typically hung on walls using fasteners such as nails and screws. Since the electrical conductors behind these walls are hidden from view, the person hanging these items is exposed to the same hazards described above.

For these reasons, in 1990, the National Electrical Code (NEC) was amended to require that electrical conductors be secured at least one-and-one-quarter inches (1¼") behind the wall. Even in the absence of such regulation, it is, of course, prudent to secure electrical conductors a sufficient distance behind the wall to ensure that a nail or screw does not go through the wall into a conductor, thereby causing injury and/or creating a fire hazard.

To address this problem and to conform with the NEC, devices were developed in an effort to securely and uniformly maintain electrical conductors a safe distance behind a wall. An example of such a device is shown in U.S. Pat. No. 5,141,185 (the '185 patent). The '185 patent discloses an L-shaped bracket, one arm of which is adapted to be bent back with respect to the other arm of the bracket to secure conductors therebetween. The bracket is made out of a bendable, substantially non-resilient metal which can be crimped, if necessary, to hold the conductors between the arms of the bracket.

There are several disadvantages associated with the '185 patent. While the device disclosed therein maintains the conductors a desired distance from the wall, the device is not suited for tightly gripping or clamping the conductors. As a result, the conductors tend to slide or slip vertically within the bracket, which causes the conductors to buckle toward the wall in areas where the conductors are not held by the bracket. This problem is particularly acute when the device is holding several conductors of varying diameter and size, as shown in FIG. 12 of the '185 patent. In this situation, smaller diameter conductors adjacent larger diameter conductors are especially prone to slip, which can result in code violation. Another problem associated with the device of the '185 patent is that the device is made out of a bendable but substantially non-resilient metal. Thus, if the device is inadvertently bent out of position during the installation process, the conductors held by the device will not be properly positioned with respect to the wall according to NEC standards. Yet another problem is that the device sometimes requires crimping the arm of the bracket around individual conductors, which can be cumbersome and time consuming.

Another type of device is made out of a stiff, plastic. The device has a plurality of individual slots of a predetermined width, formed by adjacent arms. The arms are resiliently biased to a closed position. A conductor can be inserted into a slot by pulling an arm to open a corresponding slot. After the conductor is inserted into the slot, the arm is released to return to its biased closed position, thereby holding the conductor within the slot. Such a device suffers from the slippage problem described above to an even greater extent than the '185 patent because the slots are of predetermined width and thus are not adapted for tightly gripping most conductors. Moreover, because the arms of the device are made out of plastic, the arms cannot be crimped to apply a compressive force to the conductor.

SUMMARY OF THE INVENTION

Among the several objects of this invention may be noted the provision of a conductor holding device which is adapted to securely maintain one or more conductors a desired distance from a wall; the provision of such a holding device which is designed for tightly clamping each conductor to hold it against vertical slippage; the provision of such a holding device which is easy to secure to a support member; the provision of such a holding device which can readily be manipulated to hold one or more conductors; the provision of a holding device which is adapted for handling conductors having a wide variety of diameters and shapes; the provision of such a device which can be readily modified to accommodate a support member having a relatively small front-to-rear dimension; the provision of a device which is assembled in a unitary fashion to prevent parts from being lost; and, the provision of holding device fabricated from parts which are economical to produce.

In accordance with the above objects, a device is provided which is adapted to be mounted on a support member for holding a conductor in a substantially fixed position extending generally parallel to the support member. The device comprises a bracket having an arm with at least one opening therein. The bracket is adapted to be mounted on the support member so that the arm extends laterally from the support member 12 at one side of the stud. The device further comprises a clamp having a head and at least one leg projecting from the head adapted for reception in the opening in the arm. The leg of the clamp is movable in the opening in an axial direction with respect to the leg so that the head of the clamp can be pushed closer to the arm to move the clamp to a clamping position in which the head of the clamp is in clamping engagement with a conductor disposed between the head and the arm and extending generally parallel to the support member The device also comprises a retainer for retaining the clamp in the clamping position.

Other objects and features will be in part apparent and in part pointed out hereinafter.

BRIEF DESCRIPTION OF THE DRAWINGS

In the accompanying drawings which form a part of the specification and are to be read in conjunction therewith and in which like reference numerals are used to indicate like parts in the various views:

FIG. 2 is an exploded perspective view of a bracket of the device and a series of clamps illustrating connection of the clamps to the bracket;

FIG. 3 is a top plan view of the device secured to the support member and showing the clamps holding conductors against the bracket;

FIG. 4 is a fragmentary view showing a clamp and more particularly protrusions on the head of the clamp for engaging a conductor;

FIG. 5 is an enlarged fragmentary, horizontal cross sectional view showing the clamp holding a conductor against the bracket;

FIG. 6 is an enlarged fragmentary view of a leg of the clamp secured within an opening in the bracket;

FIG. 7 is a fragmentary, back side, elevational view showing the leg of the clamp received within the opening in the bracket; and FIG. 8 is a fragmentary, back side, elevational view showing the leg of the clamp prior to being positioned in the opening in the bracket.

DETAILED DESCRIPTION OF THE PREFERRED EMBODIMENTS

Figure 1:
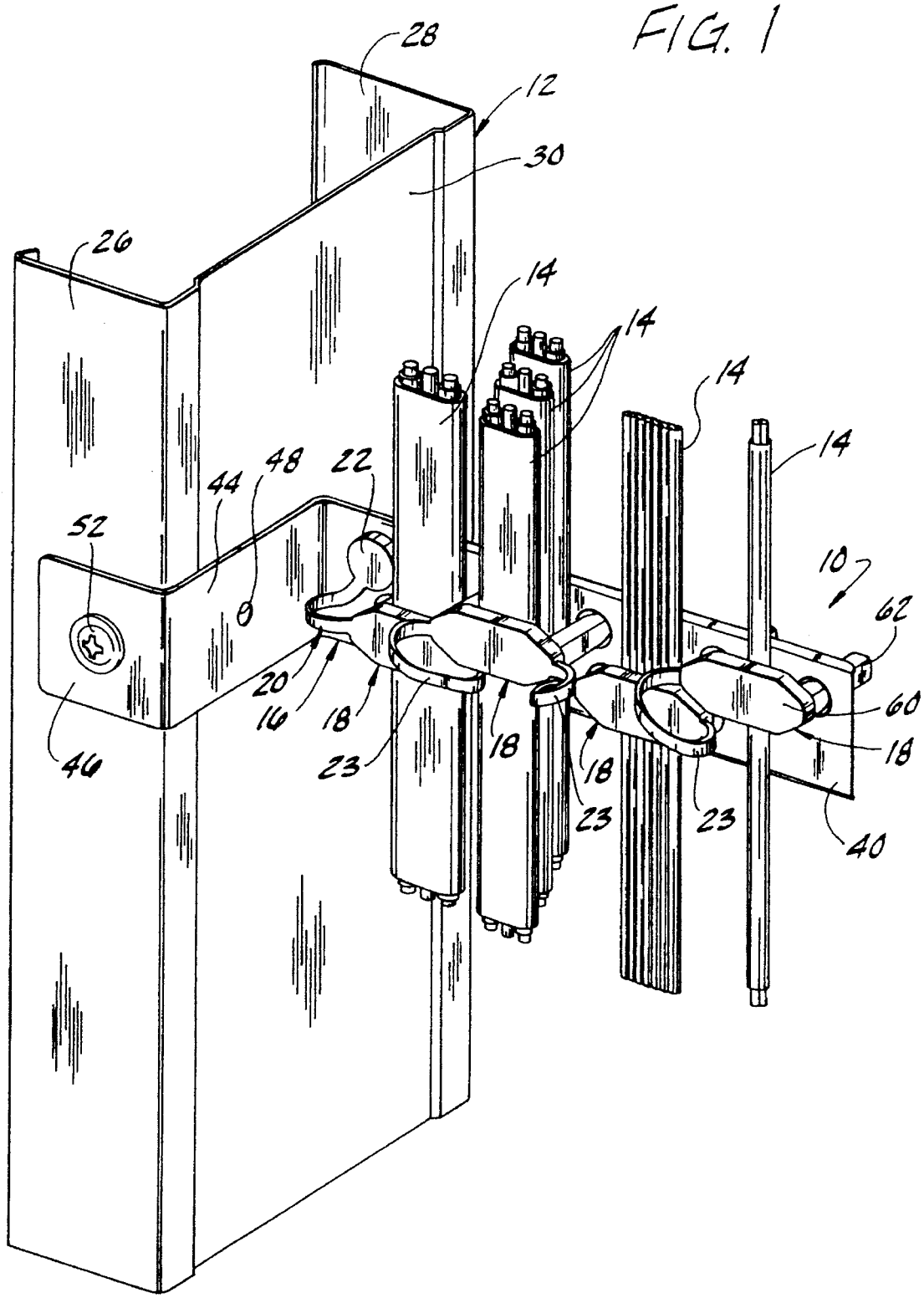
FIG. 1 is a perspective view of a device of the present invention shown mounted on a support member and holding conductors in a substantially fixed position extending generally parallel to the support member.

Referring now to the drawings, and initially to FIG. 1, a device according to a preferred embodiment of the present invention is designated generally by the numeral 10. The device 10 is adapted to be mounted on a support member 12 for holding conductors 14 in a substantially fixed position extending generally parallel to the support member. The device 12 comprises a bracket, generally indicated at 16, and a series of clamps, each generally designated 18, for clamping a plurality of conductors 14 in fixed position with respect to bracket 16. In the preferred embodiment, the clamps are secured together by an integral flexible connector, generally designated 20. Connector 20 includes a plug 22 adapted to be received within a hole 24 (shown in FIG. 2) in the bracket 16, and a series of flexible strips 23 interconnecting the plug 22 and the individual clamps 18. Connector 20 allows the device to be assembled and sold as a single unit to facilitate use of the device and to prevent misplacement and loss of the individual clamps.

As shown in the drawings, the support member is a metal stud of conventional design having opposing front and back flanges 26 and 28, respectively, and an orthogonal interconnecting side 30. It will be understood, however, that a device of the present invention is also suitable for use with wood support members (e.g., wood "2×4's"). A plurality of such wall studs are installed to define a vertical frame for a wall W of a building (FIG. 3). The wall W is typically of plasterboard and is adapted to be secured to the front flange 26 of stud 12 with screws, nails or other fasteners.

Referring to FIG. 2, bracket 16 has an arm 40 with paired openings 42 for receiving the clamps 18. Bracket 16 further comprises a side part 44 that extends generally at a right angle to the arm, and a front part 46 that extends generally at a right angle to side part 44. As shown best in FIGS. 1 an 3, the length of side part 44 determines the distance that conductors 14 are maintained from the front flange 26 of support member 12, and thus it should be sized to accommodate safety regulations and other safety considerations for maintaining the conductors a fixed distance from plasterboard that is subsequently secured to the support member. Referring to FIG. 2, side part 44 has a hole 48 which is adapted to receive a fastening device (not shown), such as a nail or screw, to secure bracket 16 to support member 12. The front flange 46 of the bracket has a hole 50 which is likewise adapted to receive a fastening device, such as screw 52, to secure the bracket to the support member, as shown in FIG. 1. As shown in FIG. 2, side part 44 can also optionally include a zone of weakness, such as scored line 54, which allows front flange 46 and a front portion of side part 44 to be separated from bracket 16. In most applications, particularly for standard metal studs and wood "2×4's," the bracket 16 is secured to the front flange 26 of support member 12 via the front part 46 of the bracket, as shown in FIG. 1. However, for support member (e.g., furring strips) having a smaller dimension than the interconnecting side 30 of a conventional support member 12, the side part 44 of the bracket can be shortened by separating the bracket at score line 54. The bracket can thereafter be secured to the support member (e.g., furring strip) by driving a fastener into the member through hole 48 in side part 44 of the bracket.

When bracket 16 is secured to the support member 12, arm 40 extends generally laterally outwardly from the member, as shown in FIGS. 1 and 3. Thus, conductors 14 secured to the bracket are maintained equidistant from the wall W that is subsequently secured to front flange 26 of the support member Bracket 16 is preferably a one-piece part formed of flexible but resilient metal, such as spring steel, to ensure that the bracket returns to its FIG. 1 position even if it is inadvertently bent prior to or during installation of wall W. Bracket 16 could also be made out of other durable, resilient materials, as is well understood by those skilled in the art.

As stated above, the series of clamps 18 are coupled together by the integral connector 20 which is secured to the arm 40 of bracket 16 by plug 22. The flexible strips 23 of the connector are of sufficient length and flexibility to permit one clamp to be installed on the bracket independent of the other clamps.

In the preferred embodiment, each clamp comprises a relatively thin flat elongate head 60 and two legs 62 projecting from adjacent opposite ends of the head. The legs of the clamp are adapted for reception in corresponding paired openings 42 in the arm 40 of the bracket, and are movable in the openings in an axial direction with respect to the legs so that the head 60 of the clamp can be pushed closer to the arm to a position in which it is in clamping engagement with a conductor disposed between the head and the arm (see FIGS. 1 and 3). The legs 62 of each clamp 18 can be sized relatively long (e.g., 0.750 in.) so that the spacing between the head 60 of the clamp 18 and the arm 40 of bracket 16 can be varied over a wide range to accommodate one or more conductors having thicknesses which vary over a wide range.

Referring to FIG. 3, the head 60 of each clamp has a top side 64 and a bottom side 66. The top side 64 is sized and configured so that a thumb can be pressed against it to push the legs 62 of the clamp in openings 42 to move the head 60 of the clamp into the aforesaid clamping position in which the bottom side 66 of the head forcefully clamps conductor 14 against arm 40 of bracket 16. It will be understood that the size and shape of the head 60 of each clamp may vary without departing from the scope of this invention. The number of legs 62 on each clamp may also vary (from one to two or more).

Referring to FIGS. 4 and 5, the bottom side 66 of the head 60 of each clamp is formed with a plurality of integral protrusions 68 (e.g., four protrusions). These protrusions are adapted to engage conductor 14 and to apply a localized compressive force thereto to assist in holding the conductor against slippage in the direction of the conductor's length (see FIG. 5). Similarly, arm 40 can include a rib 70 between each set of paired openings 42 (see FIGS. 2 and 5). This rib 70 is adapted to engage the other side of conductor 14 when the clamp is pushed into its clamping position, thereby to apply a generally opposing localized compressive force to the conductor to assist in holding the conductor against slippage in the direction of its length (a typically vertical direction). The protrusions 68 and ribs 70 are suitably shaped to avoid piercing the insulative covers on the conductors 14.

Referring to FIGS. 5–8, device 10 also includes retainer means comprising a structure 80 associated with each opening 42 in the arm 40 for fixedly maintaining the clamps 18 in their clamping positions. The structure 80 are located adjacent the openings 42 and are engageable with the legs 62 of each clamp 18 to inhibit movement of head 60 of the clamp away from arm 40 of bracket 16 after the clamp has been moved to its clamping position. Each structure 80 is preferably an annular projection surrounding a respective opening 42 in arm 40 on the rear face 82 of the arm. The annular projection extends angularly inwardly and rearwardly from the arm and is configured to bite into the leg 62 of a clamp to hold it in its stated clamping position. The annular projections 80 are preferably formed integrally with bracket 16.

In the preferred embodiment, the annular projections 80 are generally circular and the legs 62 of the clamps 18 are generally square in transverse cross-section along at least a major portion of their length (see FIGS. 6–8). The legs are sized so that the corner portions of the legs are engageable with the annular projections 80 as the legs are pushed through the openings 42, and so that the flats of the legs are spaced from the annular projections to provide gaps into which displaced corner material can flow as the legs are pushed farther into the openings. By way of example, the diameter D1 of an opening 42 may be about 0.188 inches. A leg may have a dimension D2 of 0.145 inches and a dimension D3 of 0.223 inches. This configuration reduces the forces required to push the legs through the openings while ensuring a good "bite" between the legs and the annular projections to maintain the clamp in its clamping position. It will be understood that the legs 62 and annular projections 80 can have other shapes, so long as there is a suitable interference fit between the legs and the projections to hold the legs against substantial movement of the head 60 of the clamp away from the arm 40 of the bracket after the head has been pushed in to its clamping position.

Other means may be used to retain the clamps in their clamping positions. For example, the legs 62 of each clamp 18 may have flexibly resilient barbs or the like at closely spaced intervals along the legs, the arrangement being such that the barbs flex to permit passage of the leg through the opening and then spring out to engage the arm 40 for holding the clamp in its clamping position. Similarly, the barbs may be rigid but the legs may be split along their lengths so that they resiliently flex inwardly to permit passage through the openings and then snap back to lock the clamp in a clamping position. Another option is to form the arm 40 with a series of spring fingers around each opening which flex to permit passage of a barbed or grooved leg through the opening, and then spring back for engagement with the leg to prevent retraction of the leg back through the opening. It is also contemplated that a retainer separate from the arm 40 and clamp 18 could be used to hold the clamp in its clamping position.

Referring to FIG. 2, plug 22 has a head 90 and a stem 92. Stem 92 is adapted to be inserted in hole 24 for securing the series of clamps 18 to bracket 16. Stem 92 is sized slightly larger than hole 24 so that it frictionally engages the side edge of the hole 24 to effectively maintain the plug on arm 40, as shown in FIGS. 1 and 3. The plug can be inserted into hole 24 by aligning stem 92 with hole 24 and pressing the head 90 of plug 22 in the direction of the hole. Plug 22 thus allows the series of clamps to be secured to bracket 16 so that device 10 can be assembled and sold as a single pre-assembled unit to facilitate use of the device 10 and to prevent misplacement and loss of the individual clamps. Clamps 18, connector 20, and plug 22 are preferably formed integrally as a one-piece molded plastic part. The plastic can be polyethylene or other suitable material.

In use, bracket 16 is secured to support member 12 by means of a fastener such as screw 52 (shown in FIGS. 1 and 3). A conductor or conductors are placed between a pair of openings 42 and held in place while the installer simultaneously aligns the legs 62 of clamp 18 with a pair of openings 42 and pushes the top side 64 of the clamp until the bottom side 66 of the clamp forcefully engages the conductors to clamp them in fixed position. The clamps thereafter maintain the conductors in alignment with the support member a fixed distance from the front flange 26 of the support member and the wall W. The process is repeated until all conductors are secured to arm 40 by the clamps, as shown in FIGS. 1 and 3.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A device adapted to be mounted on a support member for holding a conductor in a substantially fixed position extending generally parallel to the support member, said device comprising a bracket having an arm with at least one opening therein, said bracket being adapted to be mounted on said support member so that the arm extends laterally from the member at one side of the member, a clamp having a head and at least one leg projecting from the head adapted for reception in said opening in the arm, the leg of the clamp being movable in the opening in a first axial direction with respect to the leg so that the head of the clamp can be pushed closer to the arm to move the clamp to a clamping position in which the head of the clamp is in clamping engagement with the conductor disposed between the head and the arm and extending generally parallel to the support member, and retainer means for retaining the clamp in said clamping position, said retainer means comprising a structure on the arm adjacent the opening in the arm for biting into the leg of the clamp when the clamp is pushed to its said clamping position thereby to lock the clamp in its said clamping position by inhibiting any movement of the head of the clamp away from the arm after the clamp has been moved to said clamping position, said leg being formed so that said structure can bite into the leg at any location along at least a major portion of the length of the leg, thereby enabling the clamp to tightly clamp any conductor having any thickness within a wide range of thicknesses.

2. A device as set forth in claim 1 wherein said structure comprises an annular projection surrounding the opening in the arm.

3. A device as set forth in claim 2 wherein said arm has a front face and a rear face, the head of the clamp being movable rearwardly with respect to the arm toward said clamping position, and wherein said annular projection projects rearwardly from the rear face of the arm.

4. A device as set forth in claim 3 wherein said annular projection projects radially inwardly and rearwardly with respect to said opening.

5. A device as set forth in claim 4 wherein said arm is made of stamped sheet metal, and said annular projection is formed as an integral part of the arm.

6. A device as set forth in claim 1 wherein the opening in the arm is generally circular and the leg of the clamp is generally rectangular in transverse section.

7. A device as set forth in claim 6 wherein said clamp is a one-piece molded plastic part and said arm is a one-piece stamped metal part.

8. A device as set forth in claim 7 wherein said bracket is formed from spring steel.

9. A device as set forth in claim 1 further comprising at least one protrusion on the head of the clamp engageable with said conductor when the clamp is moved to said clamping position for applying a localized compressive force to the conductor to assist in holding the conductor against slippage of the conductor in the direction of its length.

10. A device as set forth in claim 9 further comprising at least one rib on the arm generally opposing said at least one protrusion on the head of the clamp, said at least one rib being engageable with said conductor when the clamp is moved to said clamping position for applying a localized compressive force to said conductor to assist in holding the conductor against slippage of the conductor in the direction of its length.

11. A device as set forth in claim 1 adapted for use with one support member having a generally planar front surface for supporting a wall in a plane extending generally parallel to the front surface of the member, and a side surface extending rearwardly from the front surface, said bracket being formed for mounting the arm on the support member with the arm in a position in which one conductor clamped in fixed position by said clamp is spaced a predetermined distance rearwardly from the plane of the front surface of the support member.

12. A device as set forth in claim 11 wherein said bracket has a side part extending generally at right angle to the arm for attachment to the side surface of the support member.

13. A device as set forth in claim 12 wherein said bracket has a front part extending generally at a right angle to said side part and forming a fastening flap adapted for attachment to the front surface of the support member.

14. A device as set forth in claim 13 Wherein the side part of the bracket has a zone of weakness enabling a front portion of the side part of the bracket to be broken off thereby to shorten the length of the side part to accommodate a support member having a relative small front-to-rear dimension.

15. A device as set forth in claim 1 wherein said clamp is generally U-shaped, wherein said at least one leg is a pair of generally parallel legs projecting from the head, and wherein said at least one opening is a pair of openings therein for receiving said legs.

16. A device as set forth in claim 1 wherein said at least one leg of each clamp is relatively long so that the spacing between the head of the clamp and the arm of the bracket can be varied over a wide range to accommodate conductors having thicknesses which vary over a wide range.

17. A device as set forth in claim 16 wherein said retainer means is adapted for retaining the clamp in a clamping position suitable for a conductor having a thickness anywhere within said wide range.

18. A device adapted to be mounted on a support member for holding a series of conductors in a substantially fixed position extending generally parallel to the support member, said device comprising a bracket having an arm with a series of openings therein, said bracket being adapted to be mounted on said support member so that the arm extends laterally from the member at one side of the member, a series of clamps for clamping a series of conductors side-by-side in fixed position with respect to the support member, each clamp having a head and at least one leg projecting from the head adapted for reception in one of said openings in the arm, the leg of the clamp being movable in the opening in a first axial direction with respect to the leg so that the head of the clamp can be pushed closer to the arm to move the clamp to a clamping position in which the head of the clamp is in clamping engagement with one of the conductors disposed between the head and the arm and extending generally parallel to the support member, retainer means for retaining the clamp in said clamping position, said retainer means comprising a structure on the arm adjacent the opening in the arm for biting into the leg of the clamp when the clamp is pushed to its said clamping position thereby to lock the clamp in its said clamping position by inhibiting any movement of the head of the clamp away from the arm after the clamp has been moved to said clamping position, connector means integrally connecting the clamps of said series of clamps to form a string of clamps, and means for attaching said string of clamps to the bracket.

19. A device as set forth in claim 18 wherein said connector means comprises a flexible strip extending between and connecting each pair of adjacent clamps, said strip being of sufficient length and flexibility to permit one clamp of the pair to be installed on the bracket independent of the other clamp of the pair.

20. A device as set forth in claim 19 wherein said means for attaching the string of clamps to the bracket comprises a plug receivable in one of said openings in the arm of the bracket, and a flexible strip connecting the plug and a first clamp of the series of clamps.

21. A device as set forth in claim 18 wherein said series of clamps, said connector means, and said means for attaching said string of clamps to the bracket are integrally connected molded plastic parts.

* * * * *